United States Patent
Wu et al.

(10) Patent No.: US 8,125,574 B2
(45) Date of Patent: Feb. 28, 2012

(54) REMOTE CONTROLLER

(75) Inventors: Meng Tsung Wu, Science-Based Industrial Park Hsin-Chu (TW); Chih Hung Lu, Science-Based Industrial Park Hsin-Chu (TW); Chao Chien Huang, Science-Based Industrial Park Hsin-Chu (TW)

(73) Assignee: PixArt Imaging Inc., Hsin-Chu County (TW)

( * ) Notice: Subject to any disclaimer, the term of this patent is extended or adjusted under 35 U.S.C. 154(b) by 1164 days.

(21) Appl. No.: 11/875,565

(22) Filed: Oct. 19, 2007

(65) Prior Publication Data
US 2009/0161026 A1 Jun. 25, 2009

(30) Foreign Application Priority Data
Jan. 26, 2007 (TW) ................................ 96201579 U

(51) Int. Cl.
*H04N 5/44* (2011.01)
(52) U.S. Cl. ......... 348/734; 345/156; 345/157; 345/158
(58) Field of Classification Search .......... 345/156–158; 348/734
See application file for complete search history.

(56) References Cited

U.S. PATENT DOCUMENTS

| 7,580,620 | B2 * | 8/2009 | Raskar et al. ............ 396/55 |
| 2005/0093982 | A1 * | 5/2005 | Kuroki .................. 348/207.99 |
| 2006/0152489 | A1 * | 7/2006 | Sweetser et al. ........... 345/158 |
| 2007/0195074 | A1 * | 8/2007 | Gelissen .................... 345/204 |

FOREIGN PATENT DOCUMENTS
TW 2005-40687 12/2005
* cited by examiner

*Primary Examiner* — Kristine Kincaid
*Assistant Examiner* — Sumaiya A Chowdhury
(74) *Attorney, Agent, or Firm* — Lowe, Hauptman, Ham & Berner, LLP

(57) ABSTRACT

A remote controller for controlling a display device includes a first image sensor, a processing unit and an activation mechanism. The first image sensor is for sensing an object and forming a digital image. The processing unit is coupled to the first image sensor for calculating image variations of the object on the digital image, correspondingly controlling the display device according to the image variations and deactivating the first image sensor after the remote controller is idle for a predetermined period of time. The activation mechanism is coupled to the first image sensor for re-activating the deactivated first image sensor.

14 Claims, 2 Drawing Sheets

REMOTE CONTROLLER

CROSS REFERENCE TO RELATED APPLICATION

This application claims the priority benefit of Taiwan Patent Application Serial Number 096201579, filed on Jan. 26, 2007, the full disclosure of which is incorporated herein by reference.

BACKGROUND OF THE INVENTION

1. Field of the Invention

This invention generally relates to a remote controller, and more particularly, to a remote controller for a display device, wherein the remote controller includes an image sensor which is activated by an activation mechanism.

2. Description of the Related Art

A conventional cursor control method as disclosed in Taiwan Patent Publication No. 200540687, entitled "Apparatus for cursor control and method therefor", provides a method for controlling a cursor on a display with a hand-held device. First, a movement is detected by the hand-held device with an optical apparatus. Next, a position differential is calculated according to the detected movement. Then, the hand-held device wirelessly transmits the position differential to a specific device to control the cursor activity accordingly, and to operate an application program on the specific device according to the cursor activity. However in practical use, this optical apparatus for detecting object movement and calculating position differential, e.g. an image sensor, generally needs to detect images with a high frame rate so as to compare the images of the traced object. Therefore, the optical apparatus has to operate all the time and a power supply device has to provide its consuming power continuously. If the apparatus is used for a household remote controller, e.g. TV remote controller, it may not conform to the requirements of the household remote controller by continuously supplying power to the image sensor since the battery is required to last for more than three months.

Accordingly, there exists a need to further improve the above mentioned cursor control apparatus and method so as to solve the problems in the art.

SUMMARY OF THE INVENTION

It is an object of the present invention to provide a remote controller which includes an image sensor for sensing image variations of an object so as to control a display device, wherein the image sensor automatically stops operating after being idle for a predetermined period of time and will be re-activated by an activation mechanism thereby achieving the purpose of energy saving.

It is another object of the present invention to provide a remote controller which includes an image sensor for sensing image variations of an object so as to control a display device, wherein the display device is automatically deactivated after the remote controller is idle for a predetermined period of time so as to extend the lifetime of the image sensor.

In order to achieve the above objects, the present invention provides a remote controller for controlling a display device. The remote controller includes a first image sensor, a processing unit and an activation mechanism. The first image sensor is for sensing an object and forming a digital image. The processing unit is coupled to the first image sensor for calculating image variations of the object on the digital image, correspondingly controlling the display device according to the image variations and deactivating the first image sensor after the remote controller is idle for a predetermined period of time. The activation mechanism is coupled to the first image sensor for re-activating the deactivated first image sensor.

The present invention further provides a remote controller includes a first image sensor, a processing unit and an activation mechanism. The first image sensor is for forming a digital image. The processing unit is coupled to the first image sensor for processing the digital image and disabling the image sensor after the remote controller is idle for a predetermined period of time. The activation mechanism is coupled to the first image sensor for re-activating the deactivated first image sensor.

The remote controller according to the present invention can be deactivated automatically after the remote controller is idle for a predetermined period of time; therefore, the consuming energy thereof can be decreased and the lifetime of the first image sensor can be extended.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE PREFERRED EMBODIMENT

Figure 1:
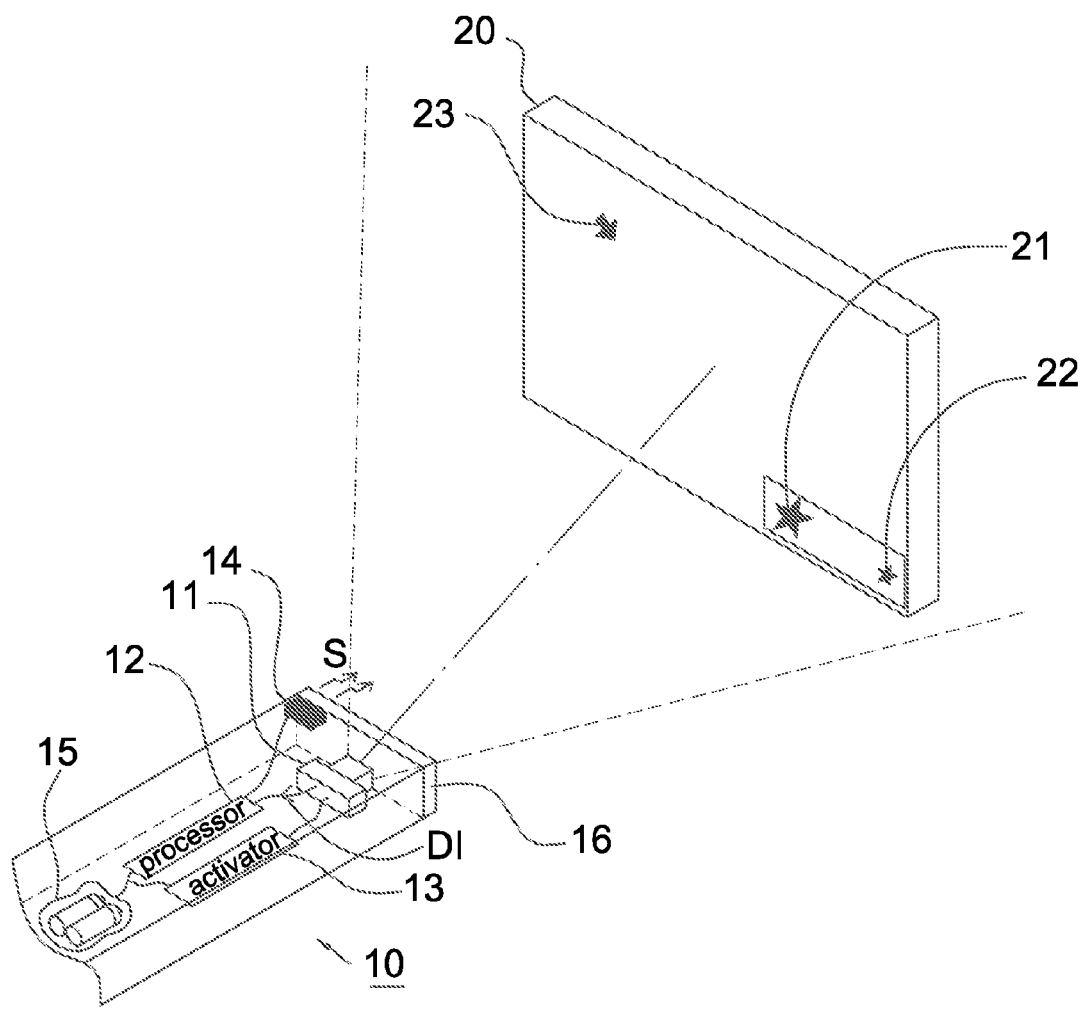
FIG. 1 shows a schematic view of a remote controller according to an embodiment of the present invention.

Referring to FIG. 1, it illustrates the remote controller 10 according to an embodiment of the present invention. The remote controller 10 includes a first image sensor 11, a processing unit 12, an activation mechanism 13, a wireless transmission unit 14, and a power supply device 15 for supplying the needed power of the first image sensor 11, the processing unit 12, the activation mechanism 13 and the wireless transmission unit 14 during operation. The remote controller 10 is for controlling the operation of a display device 20. In this embodiment, two reference objects 21 and 22 are integrated on the panel of the display device 20, and preferably they are located in front of the panel so as to be served as reference objects of the first image sensor 11 during sensing images. In one embodiment, the reference objects 21 and 22 emit light in a predetermined spectrum, e.g. infrared spectrum, and the remote controller 10 further includes an optical filter 16 of the predetermined spectrum, e.g. infrared optical filter, such that the first image sensor 11 can sense the light only from the reference objects 21 and 22 so as to simplify the image processing of the processing unit 12. It should be noted that, in other embodiment, the reference objects 21 and 22 can also be manufactured as an independent device which is separated from the display device 20; preferably, the device is disposed near the display device 20. In addition, the reference objects 21 and 22 can be formed with different shapes and numbers, i.e. the number of the reference objects can be any number rather than two as shown in the present embodiment. The embodiments of the display device 20 include a cathode ray tube (CRT) display, a liquid crystal display, a plasma display, a game display, a projection display and any other displays for displaying images. The remote controller may be corresponding controllers according to the types of the display device 20, such as a display remote controller, a game remote controller or a projection screen remote controller.

Preferably, the first image sensor 11 has a high frame rate, e.g. 200 frames/sec or even higher, for sensing the reference objects 21 and 22 and forming a digital image "DI". The processing unit 22 is coupled to the first image sensor 11 for calculating image variations, e.g. image movements or image rotations, of the reference objects 21 and 22 on the digital image "DI" and transmits a control signal "S" through the wireless transmission unit 14 to the display device 20 so as to correspondingly control the operations of the display device 20, such as correspondingly control the moving of a cursor 23 on a user interface of the display device 20 according to the displacement of the image movements. The wireless transmission unit 14 transmits a modulated signal to the display device 20 so as to control the operation of the display device 20 accordingly. In this embodiment, after the remote controller 10 is idle for a predetermined period of time, e.g. a user has selected the desired operational status of the display device 20 and not been temporarily using the remote controller 10 for more than 10 seconds, the processing unit 12 automatically controls the first image sensor 11 to stop capturing image, thereby saving the energy of the power supply device 15. Since the operation time of the first display device 11 is decreased, the lifetime of the first image sensor 11 can be prolonged. It should be understood that, the "idle" referred herein means that the images sensed by the remote controller 10 are unchanged or the buttons on the remote controller 10 are not pushed. Briefly speaking, it refers to the time that the remote controlled 10 is not operated by a user (not shown) to control the display device 20.

The activation mechanism 13 is coupled to the first image sensor 11 for being used by a user to re-activate the first image sensor 11 when the user is desired to use the remote controller 10 again. The embodiments of the activation mechanism 13 include a push-button switch, a mercury switch, a motion detection switch, a G-sensor, an electrostatic induction sensor, a human body sensor, an optical sensor, a temperature sensor, a resistive pressure sensor and a capacitive pressure sensor.

If the activation mechanism 13 is a push-button switch, a resistive pressure sensor or a capacitive pressure sensor, it can be realized, for instance, by a push button which is disposed at any places on the casing of the remote controller 10 for being pushed by a user conveniently. When the activation mechanism 13 is pushed, the first image sensor 11 can be re-activated. If the activation mechanism 13 is a mercury switch (so called level switch), it can be triggered when a user moves the remote controller 10 so as to re-activate the first image sensor 11. If the activation mechanism 13 is a motion detection switch or a G-sensor, it can sense the shake when a user moves the remote controller 10 so as to trigger the first image sensor 11 to operate again. If the activation mechanism 13 is an electrostatic induction sensor, a human body sensor or a temperature sensor, it can sense the touch or the approach of a human body so as to trigger the activation mechanism 13; for example, a temperature sensor can sense the temperature variations when a human body approaches and then controls the first image sensor 11 to operate again. If the activation mechanism 13 is an optical sensor, it can sense light variations through a photosenstitive resistor. When a user takes the remote controller 10, the optical sensor can trigger the first image sensor 11 to re-operate due to the sensing of light variations.

Figure 2:
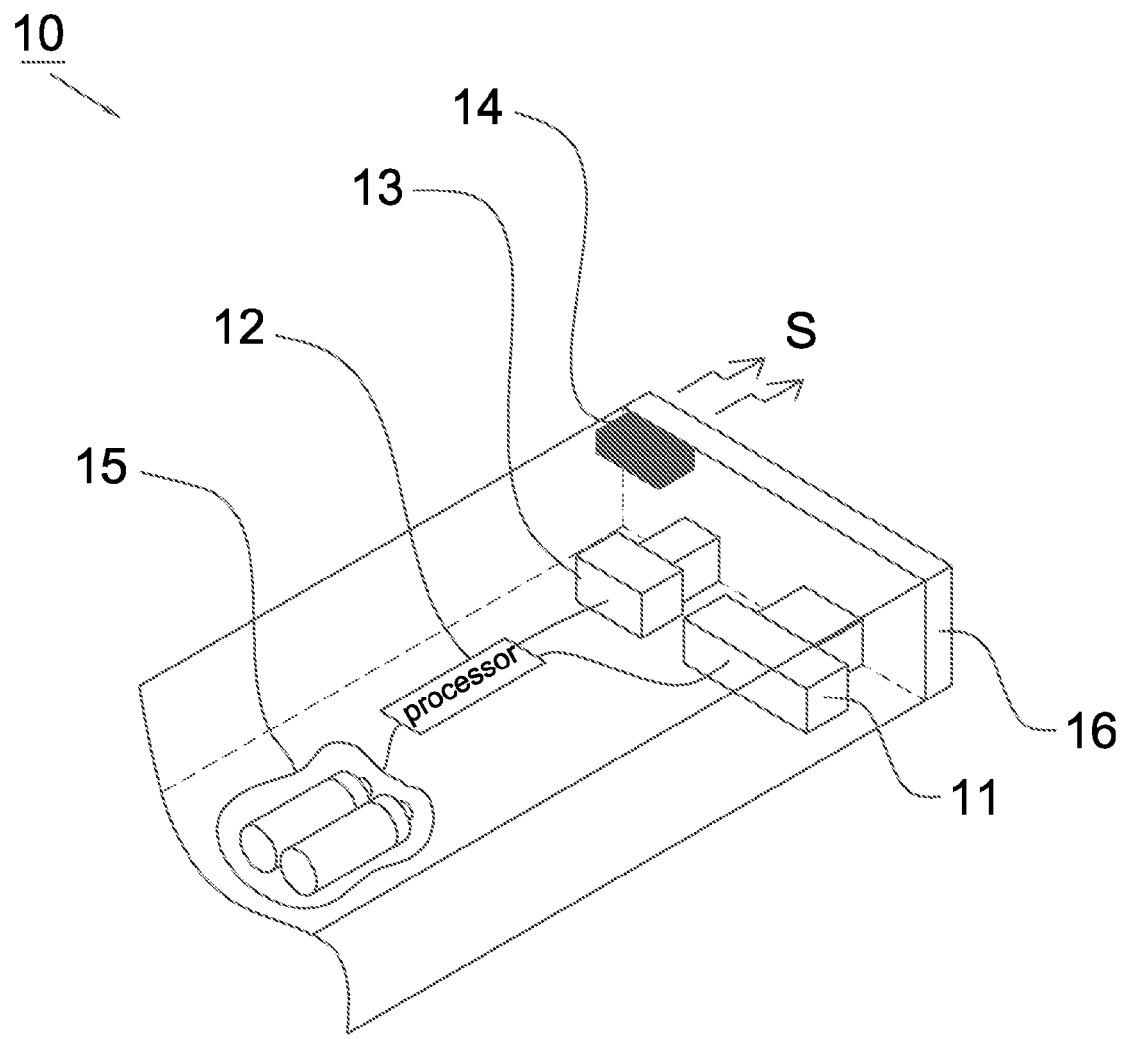
FIG. 2 shows another schematic view of a remote controller according to an embodiment of the present invention, wherein the activation mechanism is an image sensor.

Referring to FIG. 2, it shows a schematic view of the remote controller 10 according to another embodiment of the present invention, wherein the activation mechanism 13 is realized by a second image sensor which is preferably a image sensor with a lower frame rate, e.g. 1 frame/sec. In this manner, when the first image sensor 11 is deactivated after the remote controller 10 is idle of for a predetermined period of time, the activation mechanism 13 (the second image sensor) can be used to sense the image variations in front of the remote controller 10. When a user (not shown) takes the remote controller 10, the activation mechanism 13 (the second image sensor) senses image variations, thereby triggering the processing unit 12 to re-activate the first image sensor 11. Since the frame rate of the activation mechanism 13 (the second image sensor) is relatively lower, the output power of the power supply device 15 still can be effectively saved after the first image sensor 11 is shut down. It further should be understood that, in order to let the activation mechanism 13 (the second image sensor) can sense the light only from the reference objects 21 and 22, the optical filter 16 is preferably disposed in front of the first image sensor 11 and the activation mechanism 13 (the second image sensor).

It should be noted that, the purpose of this invention is to utilize the activation function of the above mentioned switches to activate the first image sensor 11 to operate again. Therefore, any other mechanisms or switches which have switching function, e.g. touching switch, can also be adapted as the activation mechanism 13 of the present invention and will not depart from the spirit and scope of the present invention.

The conventional remote controller having an optical apparatus has to provide power to the optical apparatus continuously thereby having the problem of decreasing the lifetime of battery. Compared to the conventional one, the remote controller according to the present invention (FIGS. 1 and 2) can automatically deactivate the image sensor after the remote controller is idle for a predetermined period of time and re-activate the image sensor through an activation mechanism. Therefore, the present invention can prolong the lifetime of the battery and the image sensor.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A remote controller for remote controlling a display device, comprising:
    a first image sensor for sensing an object and forming digital images with a first frame rate;
    a second image sensor for sensing the object and forming digital images with a second frame rate, wherein the second frame rate is lower than the first frame rate; and
    a processing unit, coupled to the first image sensor and the second image sensor, for calculating image variations of the object on the digital image, correspondingly controlling the display device according to the image variations and deactivating the first image sensor and activating the second image sensor after the remote controller is idle for a predetermined period of time and re-activating the first image sensor according to the digital images acquired by the second image sensor.

2. The remote controller as claimed in claim 1, wherein the first image sensor is a high frame rate image sensor.

3. The remote controller as claimed in claim 1, wherein the display device is selected from the group of a cathode ray tube display, a liquid crystal display, a plasma display and a projection screen.

4. The remote controller as claimed in claim 3, which is a display remote controller or a projection screen remote controller.

5. The remote controller as claimed in claim 1, wherein the predetermined period of time is 10 seconds.

6. The remote controller as claimed in claim 1, wherein the object emits light in a predetermined spectrum and the remote controller further comprises an optical filter disposed in front of the first and second image sensors for filtering out the light outside the band of the predetermined spectrum such that the first and second image sensors can sense the light only from the object.

7. The remote controller as claimed in claim 6, wherein the predetermined spectrum is infrared spectrum.

8. The remote controller as claimed in claim 1, wherein the object emits light in a predetermined spectrum and the remote controller further comprises an optical filter disposed in front of the first image sensor for filtering out the light outside the band of the predetermined spectrum such that the first image sensor can sense the light only from the object.

9. The remote controller as claimed in claim 1, further comprising a wireless transmission unit for transmitting a control signal generated by the processing unit to the display device.

10. The remote controller as claimed in claim 1, wherein the object emits light in a predetermined spectrum and the object is integrated on to the display device or be manufactured as an independent device.

11. A remote controller, comprising:
a first image sensor for forming digital images with a first frame rate;
a second image sensor for sensing the object and forming digital images with a second frame rate, wherein the second frame rate is lower than the first frame rate; and
a processing unit, coupled to the first image sensor and the second image sensor, for processing the digital images and deactivating the first image sensor after the remote controller is idle for a predetermined period of time and activating the second image sensor after the remote controller is idle for a predetermined period of time and re-activating the first image sensor according to the digital images acquired by the second image sensor.

12. The remote controller as claimed in claim 11, wherein the first image sensor is a high frame rate image sensor.

13. The remote controller as claimed in claim 11, which is a display remote controller or a projection screen remote controller.

14. The remote controller as claimed in claim 11, wherein the predetermined period of time is 10 seconds.

* * * * *